(12) United States Patent
DiSabatino (10) Patent No.: US 9,526,217 B2
(45) Date of Patent: Dec. 27, 2016

(54) DISK SAW FELLING HEAD WITH VISIBILITY WINDOW

(75) Inventor: Benjamin DiSabatino, Brantford (CA)

(73) Assignee: DEERE & COMPANY, Moline, IL (US)

( * ) Notice: Subject to any disclaimer, the term of this patent is extended or adjusted under 35 U.S.C. 154(b) by 1142 days.

(21) Appl. No.: 13/611,918

(22) Filed: Sep. 12, 2012

(65) Prior Publication Data

US 2014/0069553 A1    Mar. 13, 2014

(51) Int. Cl.
*A01G 23/081* (2006.01)

(52) U.S. Cl.
CPC .................................. *A01G 23/081* (2013.01)

(58) Field of Classification Search
CPC .. A01G 23/083; A01G 23/087; A01G 23/091; A01G 23/093; A01G 23/095; A01G 23/08; A01G 23/081
See application file for complete search history.

(56) References Cited

U.S. PATENT DOCUMENTS

| | | | |
|---|---|---|---|
| 5,816,299 A | 10/1998 | Mathews et al. | |
| D412,334 S | 7/1999 | DiSabatino et al. | |
| 5,931,210 A * | 8/1999 | Kurelek | A01G 23/081 144/336 |
| 6,374,877 B1 | 4/2002 | Wildey | |
| 6,382,274 B1 * | 5/2002 | Hicks | A01G 23/091 144/336 |
| 6,640,850 B1 * | 11/2003 | Hicks | A01G 23/091 144/336 |

OTHER PUBLICATIONS

Woodharvesting, Feller Buncher Tigercat 855C with DT2000 Felling Head, Nov. 19, 2010, https://www.youtube.com/watch?v=u_ZZGyqejbY.*
TigercatForestry, Tigercat pine thinning, Jun. 4, 2010, https://www.youtube.com/watch?v=TrKA30kUuZI.*
Image of FD21 Felling Head (1 page)(prior art before Sep. 12, 2012).
Background Information (1 page)(prior art before Sep. 12, 2012).
Brochure on FD21 Felling Head (2 pages)(2002).
FD21 Felling Head Drawings (3 pages)(2004).
Brochure on Feller Bunchers 643K/843K Wheeled (16 pages)(Jul. 2012).
Image of FD21 Felling Head on Feller Buncher (1 page)(2003).
Image of FD45 Felling Head Rear View (1 page)(prior art before Sep. 12, 2012).
Image of FD45 Felling Head on Feller Buncher (1 page)(prior art before Sep. 12, 2012).

* cited by examiner

*Primary Examiner* — Matthew G Katcoff (57) ABSTRACT

A disk saw felling head comprises a motor housing positioned between a disk saw and harvesting and bunching cylinders so as to provide a visibility window laterally between the motor housing and a mounting post promoting visibility through the visibility window toward a cutting zone.

13 Claims, 6 Drawing Sheets

DISK SAW FELLING HEAD WITH VISIBILITY WINDOW

FIELD OF THE DISCLOSURE

The present disclosure relates to a disk saw felling head.

BACKGROUND OF THE DISCLOSURE

A forestry vehicle includes a base machine and a disk saw felling head attached to the base machine to be manipulated and controlled thereby. The disk saw felling head is configured to fell trees and to accumulate them for subsequent collective deposition.

The disk saw felling head has a disk saw. The disk saw is rotatable to fell a tree. In some cases, the disk saw felling head has a harvesting arm to gather a newly felled tree, and a bunching arm to hold the newly felled tree on the head.

SUMMARY OF THE DISCLOSURE

According to an aspect of the present disclosure, a disk saw felling head has a fore-aft dimension, a lateral dimension, and a vertical dimension such that the fore-aft dimension, the lateral dimension, and the vertical dimension are perpendicular to one another. The disk saw felling head comprises a frame comprising a spine, a motor housing, and a side accumulation pocket. The spine comprises a first mounting post and a second mounting post. The first and second mounting posts are configured for attaching the disk saw felling head to a base machine and spaced laterally apart from one another relative to the lateral dimension. The motor housing is positioned laterally between the first and second mounting posts relative to the lateral dimension. The side accumulation pocket is positioned laterally between the motor housing and the second mounting post relative to the lateral dimension, and could extend laterally beyond the second mounting post.

The disk saw felling head comprises a disk saw housed within the frame, a motor attached to the disk saw to rotate the disk saw about an axis of the disk saw, a harvesting arm attached pivotally to the frame to pivot relative thereto to move a felled tree into the side accumulation pocket, a harvesting cylinder operable to pivot the harvesting arm relative to the frame, a bunching arm attached pivotally to the frame to pivot relative thereto to hold the felled tree in the side accumulation pocket, and a bunching cylinder operable to pivot the bunching arm relative to the frame. The disk saw is partially exposed outside the frame in a cutting zone at a front of the disk saw felling head relative to the fore-aft dimension. The motor is positioned within the motor housing. The motor housing is positioned between the disk saw and the harvesting and bunching cylinders relative to the vertical dimension so as to provide a visibility window laterally between the motor housing and the first mounting post relative to the lateral dimension promoting visibility through the visibility window toward the cutting zone in a forward direction relative to the fore-aft dimension.

The above and other features will become apparent from the following description and the coupled drawings.

BRIEF DESCRIPTION OF THE DRAWINGS

The detailed description of the drawings refers to the accompanying figures in which.

DETAILED DESCRIPTION OF THE DRAWINGS

Figure 1:
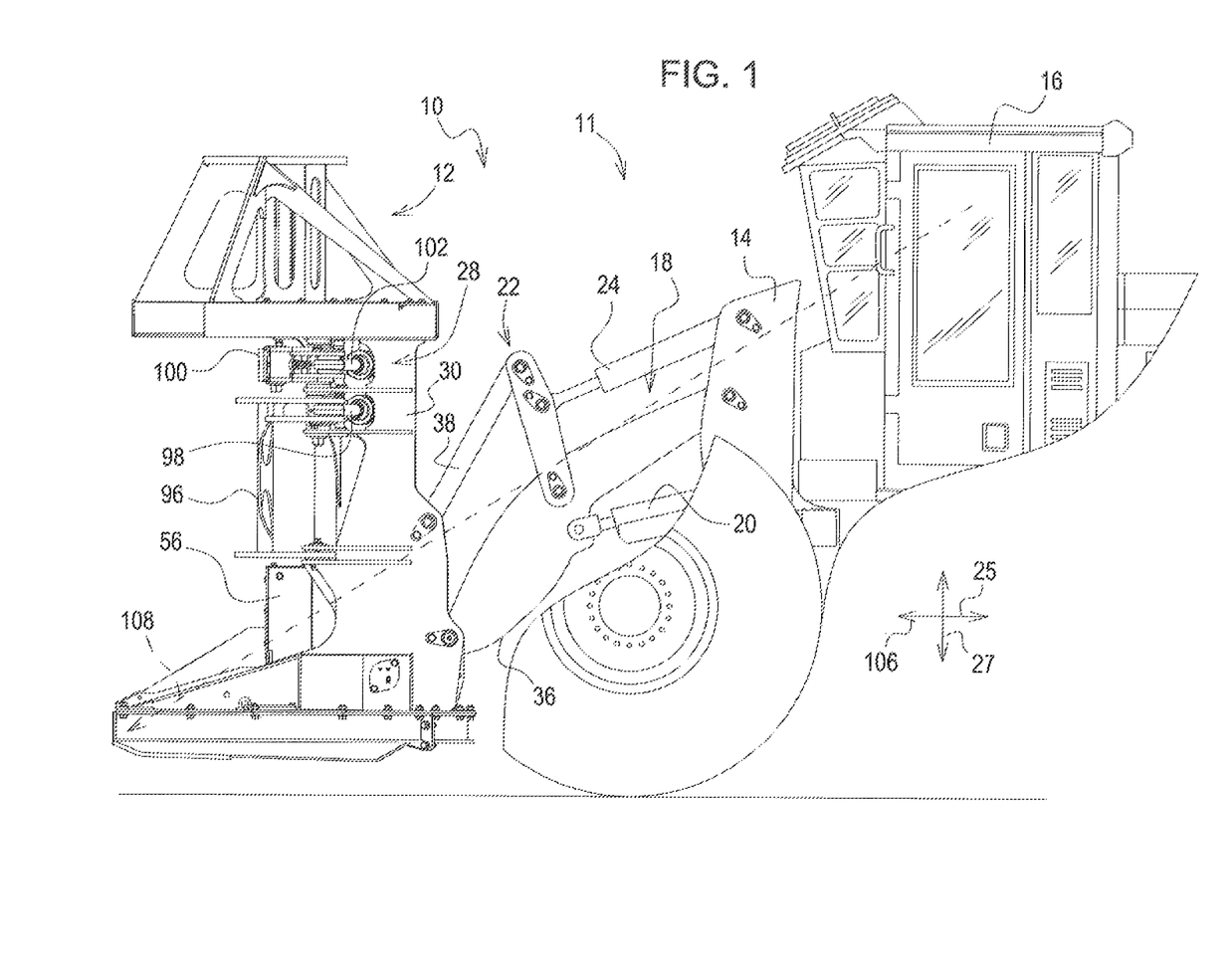
FIG. 1 is a side elevation view showing a simplified forestry vehicle including a base machine and a disk saw felling head attached to the base machine for manipulation thereby and showing a line of sight from the operators station to a cutting zone of the disk saw felling head.

Referring to FIG. 1, there is shown a forestry vehicle 10 including a base machine 11 (e.g., wheeled base machine) and a disk saw felling head 12 attached to the base machine 11 to be manipulated and controlled thereby. The disk saw felling head 12 is configured to fell trees and to accumulate them for subsequent collective deposition.

The base machine 11 has a front frame 14, a rear frame, an operator's station 16, a boom 18, a pair of hydraulic lift cylinders 20 (left and right, the left shown and representative of the right), a pivot linkage 22, and a pair of hydraulic pivot cylinders 24 (left and right, the left shown and representative of the right). The front frame 14 and the rear frame are articulated to one another for relative pivotable movement therebetween about an articulation axis. The operator's station 16 is mounted to the rear frame. The boom 18 is attached pivotally to the front frame 14, and the head 12 is attached pivotally to the boom 18. The lift cylinders 20 are attached to the front frame 14 and the boom 18 to raise and lower the boom 18, and thus the head 12, relative to the front frame 14. The pivot linkage 22 is attached pivotally to the boom 18 and the head 12. The pivot cylinders 24 are attached to the boom 18 and the linkage 22 to pivot the linkage 22, and thus the head 12, forwardly and rearwardly relative to the boom 18.

Figure 3:
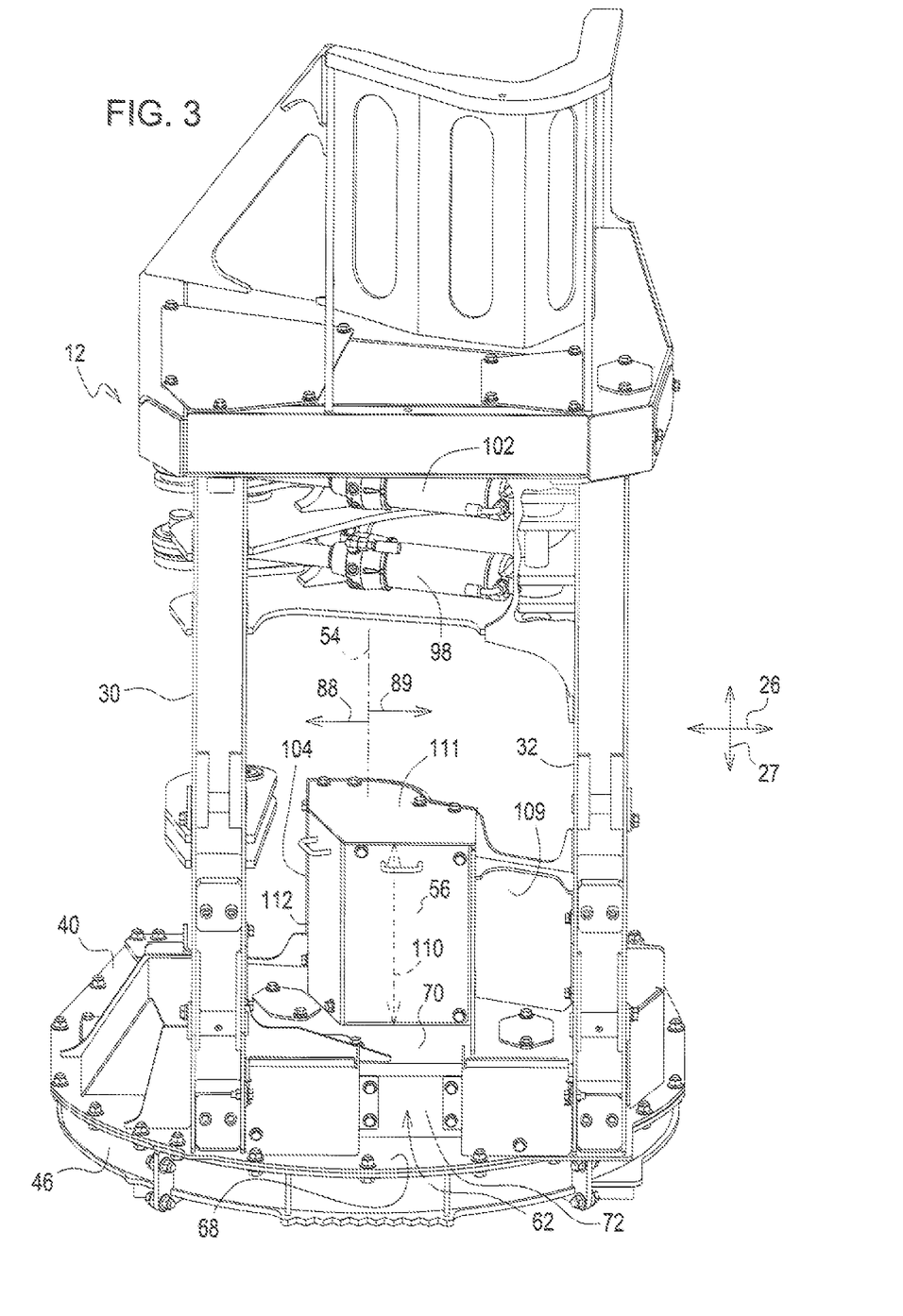
FIG. 3 is a rear view of the disk saw felling head as viewed along the line of sight in FIG. 1 showing a visibility window on one side of a motor housing (left side in FIG. 3)
Figure 4:
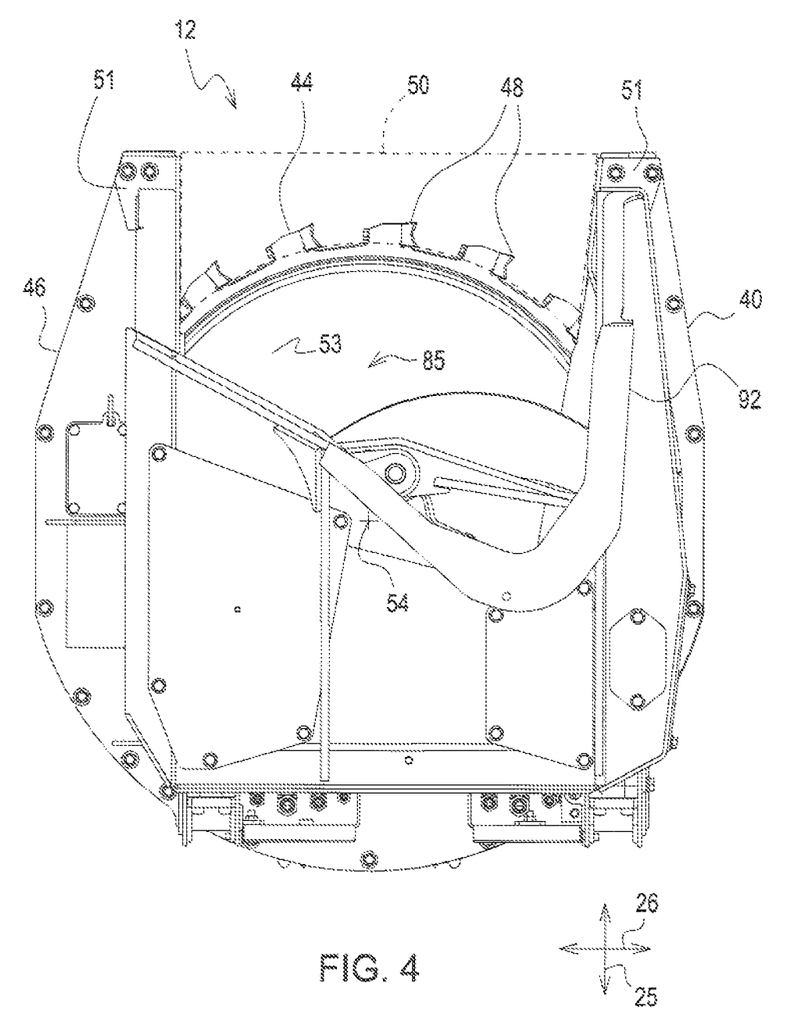
FIG. 4 is a top plan view of the disk saw felling head.

Referring to FIGS. 1 and 3, the head 12 has a fore-aft dimension 25, a lateral dimension 26, and a vertical dimension 27. The fore-aft dimension 25, the lateral dimension 26, and the vertical dimension 27 are perpendicular to one another.

Figure 2:
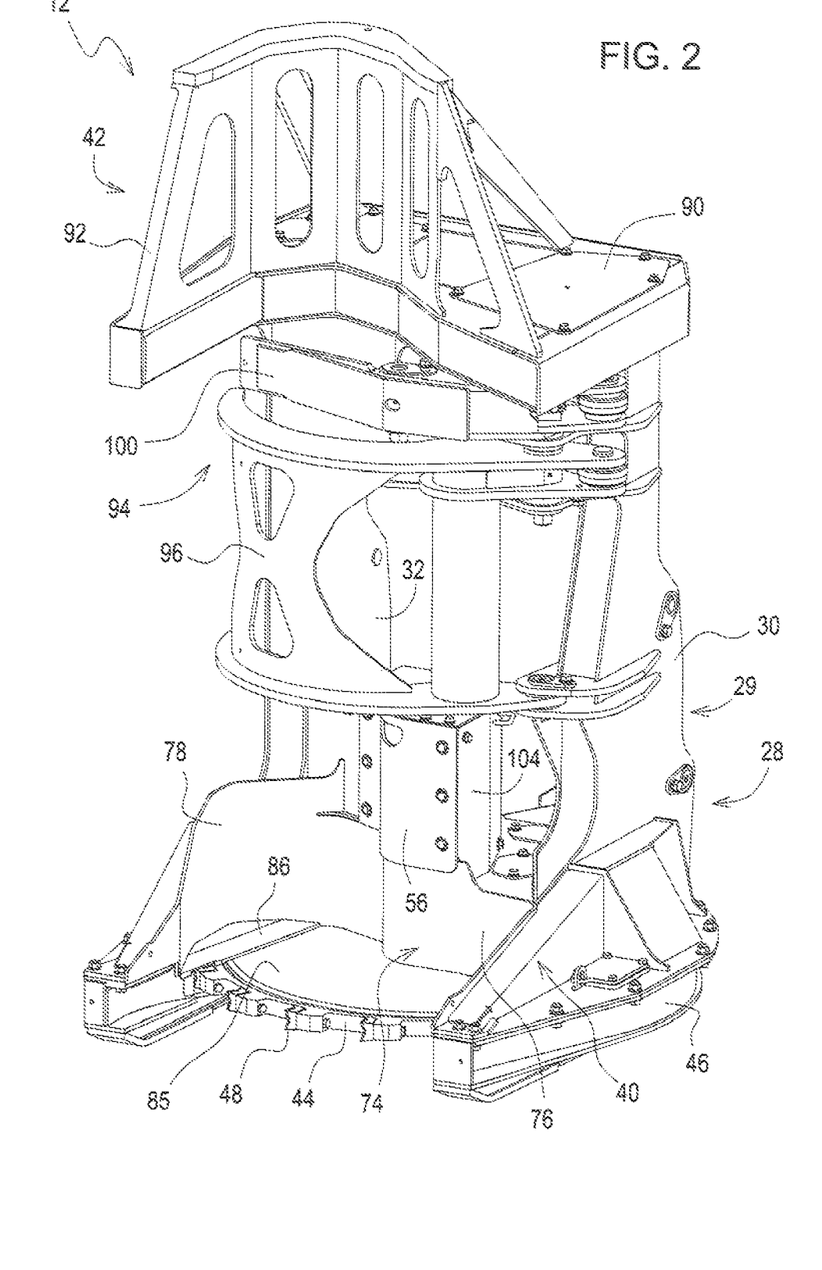
FIG. 2 is a perspective view of the disk saw felling head.

Referring to FIG. 2, the head 12 includes a frame 28. The frame 28 includes a spine 29, which includes a left or first mounting post 30 and a right or second mounting post 32. The first and second mounting posts 30, 32 are configured for attaching the head 12 to the base machine 11 and are spaced laterally apart from one another relative to the lateral dimension 26 of the head 12. The spine 29 and its mounting posts 30, 32 extend longitudinally in the vertical dimension 27.

Referring to FIG. 1, the boom 18 includes a left or first boom arm 36 and a right or second boom arm 36, the first boom arm 36 shown and representative of the second boom arm 36. The first boom arm 36 and the second boom arm 36 are attached pivotally to the front frame 14 and attached pivotally respectively to the first mounting post 30 and the second mounting post 32. The lift cylinders 20 are attached respectively to the boom arms 36.

The pivot linkage 22 includes a left or first link 38 and a right or second link 38, the first link 38 shown and representative of the second link 38. The first link 38 and the second link 38 are attached pivotally respectively to the first mounting post 30 and the second mounting post 32.

Referring to FIGS. 2-5, the head 12 includes a saw-and-motor section 40 and a horn section 42. The saw-and-motor section 40 is attached to a lower portion of the spine 29. The horn section 42 is attached to an upper portion of the spine 29 above the lower portion relative to the vertical dimension 27 of the head 12.

In the saw-and-motor section 40, the head includes a disk saw 44 configured for felling trees. The disk saw 44 is attached rotatably to, and positioned largely within, a saw housing 46 of the frame 28 so as to be housed within the frame 28 and has cutting teeth 48 spaced around its periphery for cutting through a tree. The disk saw 44 is partially exposed outside the saw housing 46, and thus the frame 26, in a cutting zone 50 of the head 12 at a front of the head 12 relative to the fore-aft dimension 25 of the head 12.

The saw housing 46 includes a left or first housing extension 51 and a right or second housing extension 51. The cutting zone 50 is defined as an imaginary vertical column relative to the vertical dimension 27, the column extending laterally between the housing extensions 51 relative to the lateral dimension 26. The housing extensions 51 project in front of the disk saw 44 relative to the fore-aft dimension 25 such that the cutting zone 50 is defined between the front of the housing extensions 51 and an imaginary line interconnecting where the disk saw exits the left housing extension 51 and re-enters the right housing extension 51.

Figure 6:
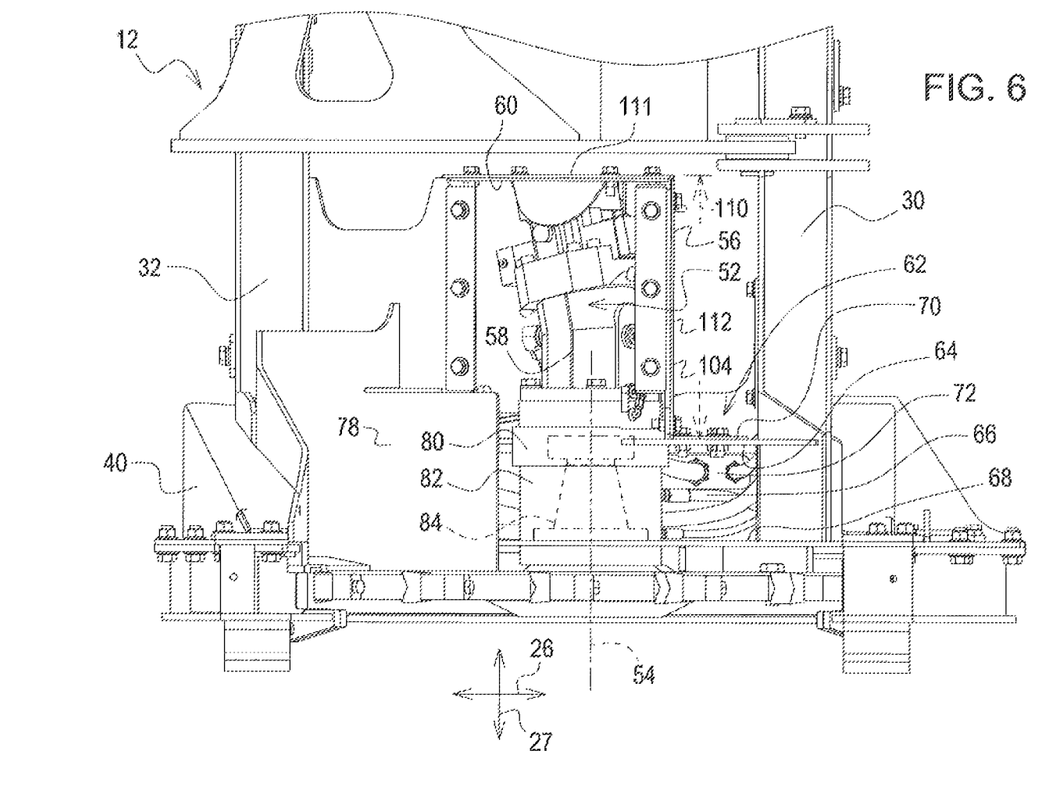
FIG. 6 is a front elevation view showing a hydraulic motor within the motor housing.

Referring to FIG. 6, in the saw-and-motor section 40, the head 12 includes a hydraulic motor 52. The motor 52 is mounted to the frame 28 and attached to the disk saw 44 to rotate the disk saw 44 about a central axis 54 of the disk saw 44.

The frame 28 includes a motor housing 56 positioned laterally between the first and second mounting posts 30, 32 relative to the lateral dimension 26. The motor 52 is housed in the motor housing 56. For example, the main body 58 of the motor 52 is housed in an interior region 60 of the motor housing 56.

Figure 5:
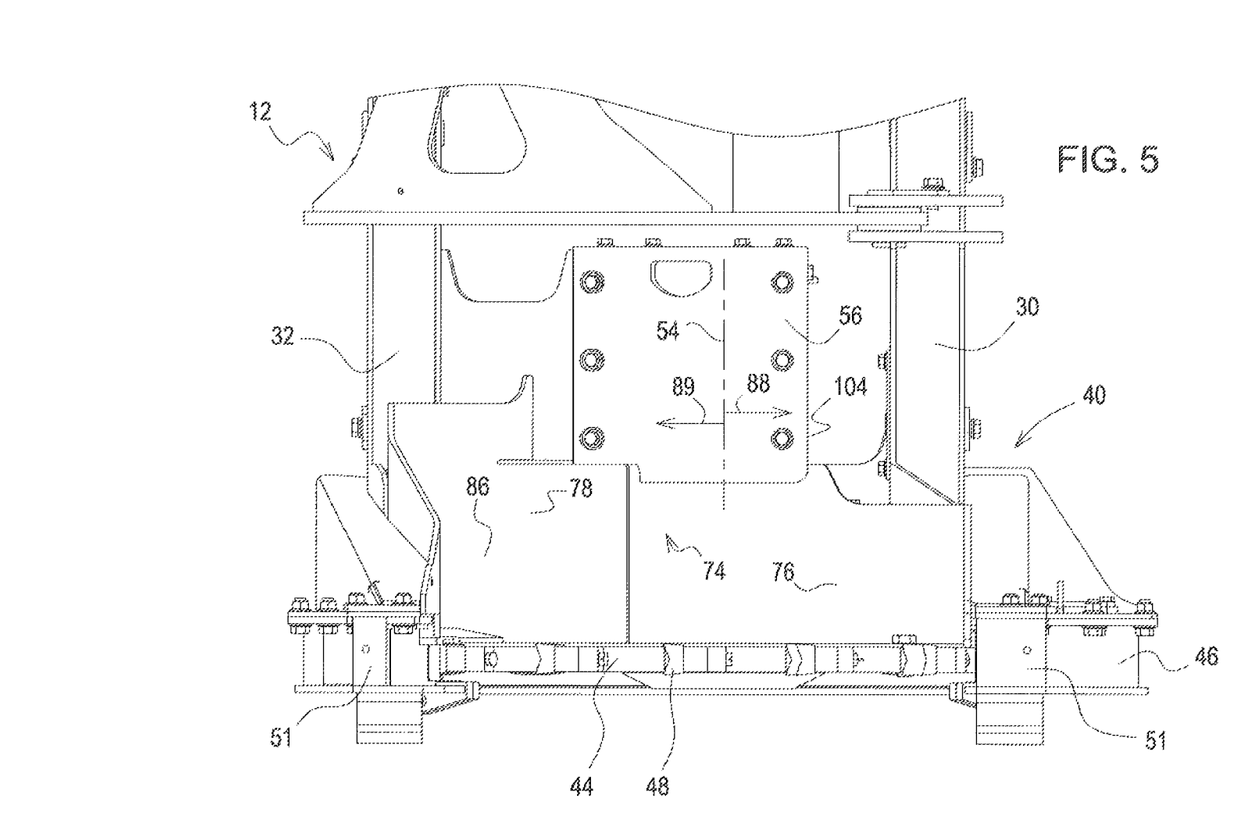
FIG. 5 is an enlarged front elevation view showing the visibility window on a side of the motor housing opposite to an accumulation pocket.

Referring to FIGS. 3, 5, and 6, the frame 28 includes a hollow box deck 62. The motor 52 is mounted to the deck 62. The motor housing 56 is mounted on top of the deck 62. The deck 62 includes an interior region 64 in which a number of hydraulic lines 66 of the head 12 is positioned. The deck 62 is positioned between the disk saw 44 and the motor housing 56 relative to the vertical dimension 27 and between the first and second mounting posts 30, 32 relative to the lateral dimension 26.

The deck 62 includes a bottom wall 68, a top wall 70, a rear wall 72, and a front wall 74. Each of the walls 68, 70, 72, 74 spans laterally between the first and second mounting posts 30, 32. The walls 68, 70, 72, 74 cooperate to provide the deck 62 with a hollow, generally box shape. The bottom and top walls 68, 70 are parallel to one another and are horizontal when the head 12 stands upright. The bottom wall 68 is configured, for example, as a plate attached (e.g., welded) to the first and second mounting posts 30, 32. The top and rear walls 70, 72 are provided, for example, by a generally L-shaped plate attached (e.g., welded) to the first and second mounting posts 30, 32 and to the bottom wall 68 at the rear of the L-shaped plate. The rear and front walls 72, 74 extend vertically between the bottom and top walls 68, 70 relative to the vertical dimension 27. The front wall 74 is provided, for example, by a left or first front plate 76 and a right or second front plate 78 which are attached (e.g., welded) to the bottom and top walls 70, 72.

The main body 58 of the motor 52 is mounted atop the deck 62. The deck 62 includes an annular motor mounting block 80 attached (e.g., welded) to the top wall 70 in an aperture thereof. The main body 58 is detachably fastened to the motor mounting block 80 with threaded fasteners. The deck 62 includes a tube 82 extending from and attached to (e.g., welded) the motor mounting block 80 and extending through and attached to (e.g., welded) the bottom wall 68. A first bearing (not shown) and a second bearing (not shown), each in the form of for example, a tapered roller bearing, are mounted respectively within the motor mounting block 80 and the tube 82.

A rotary output 84 of the motor 52, in the form of, for example, a forged mandrel, extends through the first and second bearings for rotation therein about the axis 54. The rotary output 84 is attached to the disk saw 44 by use of a flange that underlies the disk saw 54 and threaded fasteners extending through the flange and the disk saw 44 into the rotary output 84.

In the saw-and-motor section 40, the frame 28 includes a tree-receiving region 85 configured for receiving felled trees once they are felled by the saw 44. The tree-receiving region 85 includes a side accumulation pocket 86 configured for accumulating the felled trees. Due to the pocket 86, the tree-receiving region 85 is rearwardly deeper on a right or second side 89 of the axis 54 than on an opposite left or first side 88 of the axis 54 relative to the lateral dimension 26. The pocket 86 is positioned laterally between the motor housing 56 and the second mounting post 32 relative to the lateral dimension 26 and could extend laterally beyond the second mounting post 32 relative to the lateral dimension 26.

Referring to FIGS. 2 and 3, in the horn section 42, the frame 28 includes a box platform 90 mounted atop the mounting posts 30, 32 and a horn 92 mounted atop the platform 90. The horn 92 and the platform 90 are configured so as to facilitate accumulation of felled trees in the pocket 86.

The head 12 includes an arm section 94 positioned between the saw-and-motor section 40 and the horn section 42 relative to the vertical dimension 27. In the arm section 94, the head 12 includes a harvesting arm 96, a harvesting cylinder 98, a bunching arm 100, and a bunching cylinder 102. The arms 96, 100 and the cylinders 98, 102 are positioned between the motor housing 56 and the horn platform 90 relative to the vertical dimension 27.

The harvesting arm 96 is attached pivotally to the frame 28 to pivot relative thereto to more a felled tree into the side accumulation pocket 86. The harvesting cylinder 98 is attached pivotally to the mounting post 32 of the frame 28 and the harvesting arm 96 and is operable to pivot the harvesting arm 96 relative to the frame 28.

The bunching arm 100 is attached pivotally to the frame 28 to pivot relative thereto to hold the felled tree(s) in the pocket 86. The bunching cylinder 102 is attached pivotally to the mounting post 32 of the frame 28 and the bunching arm 100 and is operable to pivot the bunching arm 100 relative to the frame 28. The arms 96, 100 are attached pivotally to the frame 28 on the first side 88 of the axis 54 opposite to the pocket 86 positioned on the second side 89 relative to the lateral dimension 26. The harvesting and bunching cylinders 98, 102 are positioned outside of the interior region 84 of the deck 62. In FIG. 3, a solid plate of the frame 28 is cut away from the mounting post 32 to show mounting of the harvesting and bunching cylinders 98, 102 to the mounting post 32 on the second side 89 of the axis 54.

During a felling event, operation of the harvesting arm 96 and bunching arm 100 is coordinated in order to receive and accumulate felled trees. The harvesting arm 96 is opened in order to receive a tree onto a butt plate 53 of the tree-receiving region 85 upon felling. The harvesting arm 96 is closed to move the newly felted tree into the pocket 86. Meanwhile, the bunching arm 100 is closed in order to hold any previously felled trees in the pocket 86. Once the harvesting arm 98 moves a newly felted tree over to the pocket 86, the bunching arm 100 is opened so as to more out and around the newly felled tree in order to hold the newly felled tree with any other felled tree(s) in the pocket 86. The bunching arm 100 is segmented into a first segment attached pivotally to the frame 28 and a second segment attached pivotally to the first segment and spring-biased to an open position relative to the first segment. Such segmentation facilitates bunching of the newly felled tree by the bunching arm 100.

The motor housing 56 is positioned between the disk saw 44 and the harvesting and bunching cylinders 98, 102 relative to the vertical dimension 27 so as to provide a visibility window 104 laterally between the motor housing 56 and the first mounting post 30 on the first side 88 of the axis 54 relative to the lateral dimension 26 promoting visibility through the visibility window 104 toward the cutting zone 50 in a forward direction 106 (FIG. 1) relative to the fore-aft dimension 25. The forward direction 106 is along a forward line of sight 108 from the operator's station 16 to the cutting zone 50 through the visibility window 104.

Referring to FIG. 3, the visibility window 104 is constructed so as to promote visibility to the cutting zone 50 from the operator's station 16. The window 104 is positioned on a side of the motor housing 56 laterally opposite to the side accumulation pocket 86 relative to the lateral dimension 26. Stated otherwise, the window 104 is positioned on the first side 88 of the axis 54 relative to the lateral dimension 26. As such, the window 104 is unobstructed by felled trees positioned in the pocket 86, at least more so than a space that is between the motor housing 56 and the second mounting post 32 and is largely obstructed by a wall 109 that is configured, for example, as a plate and spans between the second mounting post 32 and the motor housing 56. The wall 109 forms part of the structure that supports the motor housing 56.

The visibility window 104 is defined by and between the motor housing 56, the first mounting post 30, and the deck 62. The motor housing 56 has a height 110 in the vertical dimension 27, and the motor housing 56 partially defines the visibility window 104 along most of its height 110. The height 110 is measured from the top wall 70 of the deck 62 to a top wall 111 of the motor housing 56 in the form of, for example, a plate.

The motor housing 56 includes an external profile, which includes a portion 112 that is laterally outermost with respect to the first side 88 of the axis 54 relative to the lateral dimension 26 and that extends vertically relative to the vertical dimension 27. The portion 112 of the external profile partially defines the visibility window 104.

The window 104 is defined partially by the deck 62. For example, the first front plate 76 of the front wall 74 partially defines the window 104. The front plate 76 may rise above the top wall 70, for supporting the motor mounting block 60 and locating welding between the front plate 76 and the top wall 70. Near the motor housing 56, the top edge of the front plate 76 ramps up to a higher level, with such ramp being laterally outward of a vertical bend in the front plate 76 in the lateral dimension 26 relative to the axis 54. The vertical bend is vertical relative to the vertical dimension 27 and defines a point at which the front plate 76 turns slightly forwardly relative to the fore-aft dimension 25 as it extends laterally outwardly in the lateral dimension 26 relative to the axis 54. In some examples, to increase the size of the window 104, the ramp may be steeper than shown, and it may be positioned closer to the motor housing 56 if permitted by, or in the absence of, the vertical bend. In examples where the front wall 74 may terminate at the top wall 70, the top wall 70 may partially define the window 104.

The welds, the fastener threads, and a number of hoses have not been shown in the drawings for simplification of illustration, it being understood that it would be well within the skill of one of ordinary skill in the art to provide those features without undue experimentation.

While the disclosure has been illustrated and described in detail in the drawings and foregoing description, such illustration and description is to be considered as exemplary and not restrictive in character, it being understood that illustrative embodiment(s) have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the appended claims.

What is claimed is:

1. A disk saw felling head, the disk saw felling head having a fore-aft dimension, a lateral dimension, and a vertical dimension such that the fore-aft dimension, the lateral dimension, and the vertical dimension are perpendicular to one another, the disk saw felling head comprising a frame comprising a spine, a motor housing, and a side accumulation pocket, the spine comprising a first mounting post and a second mounting post, the first and second mounting posts configured for attaching the disk saw felling head to a base machine, the first and second mounting posts spaced laterally apart from one another relative to the lateral dimension, the motor housing positioned laterally between the first and second mounting posts relative to the lateral dimension, the side accumulation pocket positioned laterally between the motor housing and the second mounting post relative to the lateral dimension, a disk saw housed within the frame, the disk saw partially exposed outside the frame in a cutting zone at a front of the disk saw felling head relative to the fore-aft dimension, a motor attached to the disk saw to rotate the disk saw about an axis of the disk saw, the motor positioned within the motor housing, a harvesting arm attached pivotally to the frame to pivot relative thereto to move a felled tree into the side accumulation pocket, a harvesting cylinder operable to pivot the harvesting arm relative to the frame, a bunching arm attached pivotally to the frame to pivot relative thereto to hold the felled tree in the side accumulation pocket, and a bunching cylinder operable to pivot the bunching arm relative to the frame, the motor housing positioned between the disk saw and the harvesting and bunching cylinders relative to the vertical dimension, a visibility window laterally between the motor housing and the first mounting post relative to the lateral dimension promoting visibility through the visibility window toward the cutting zone in a forward direction relative to the fore-aft dimension.

2. The disk saw felling head of claim 1, wherein the visibility window is positioned on a side of the motor housing laterally opposite to the side accumulation pocket relative to the lateral dimension.

3. The disk saw felling head of claim 1, wherein the frame comprises a hollow deck on which the motor housing is mounted, the deck is configured to accommodate at least one hydraulic line of the disk saw felling head within the deck, the deck is positioned between the disk saw and the motor housing relative to the vertical dimension and between the first and second mounting posts relative to the lateral dimension, and the visibility window is defined at least partially by the motor housing, the first mounting post, and the deck.

4. The disk saw felling head of claim 3, wherein the motor housing has a height in the vertical dimension, and the motor housing partially defines the visibility window along most of its height.

5. The disk saw felling head of claim 4, the motor housing comprises an external profile, the external profile comprises a portion that is laterally outermost with respect to one side of the axis relative to the lateral dimension and that extends vertically relative to the vertical dimension, and the portion of the external profile partially defines the visibility window.

6. The disk saw felling head of claim 3, wherein the deck comprises an interior region configured to accommodate the at least one hydraulic line, the harvesting and bunching cylinders are positioned outside of the interior region.

7. The disk saw felling head of claim 3, wherein the deck comprises a bottom wall, a top wall, a rear wall, and a front wall, and the bottom, top, rear, front walls span laterally between the first and second mounting posts.

8. The disk saw felling head of claim 7, wherein the front wall comprises a front plate attached to the bottom and top walls, and front plate of the front wall partially defines the window, and the front plate rise above the top wall.

9. The disk saw felling head of claim 8, wherein near the motor housing, a top edge of the front plate ramps up to a higher level.

10. The disk saw felling head of claim 1, wherein each of the harvesting cylinder and the bunching cylinder are positioned above the motor housing relative to the vertical dimension.

11. The disk saw felling head of claim 10, wherein the entirety of each of the harvesting cylinder and the bunching cylinder are positioned above the motor housing relative to the vertical dimension.

12. The disk saw felling head of claim 1, wherein each of the harvesting cylinder and the bunching cylinder are positioned above the visibility window relative to the vertical dimension.

13. The disk saw felling head of claim 12, wherein the entirety of each of the harvesting cylinder and the bunching cylinder are positioned above the visibility window relative to the vertical dimension.

* * * * *